United States Patent [19]

DeMeo et al.

[11] Patent Number: 4,688,890
[45] Date of Patent: Aug. 25, 1987

[54] FIBER OPTIC CABLE INNER DUCT

[75] Inventors: Joseph F. DeMeo, Edison, N.J.; Frederick B. Williamson, III, New Hope, Pa.

[73] Assignee: Goodall Rubber Company, Trenton, N.J.

[21] Appl. No.: 710,461

[22] Filed: Mar. 11, 1985

[51] Int. Cl.⁴ .............................................. G02B 6/44
[52] U.S. Cl. .................................. 350/96.23; 138/111; 174/15 C; 174/68 C
[58] Field of Search ................... 350/96.23; 174/15 C, 174/68 C, 99 R; 138/38, 39, 111, 114, 121, 178

[56] References Cited

U.S. PATENT DOCUMENTS

| 3,102,740 | 9/1963 | Plummer | 174/15 C |
| 3,161,210 | 12/1964 | Lööf | 174/68 C |
| 3,858,687 | 1/1975 | Masarky et al. | 174/68 C X |
| 3,903,353 | 9/1975 | Pirooz | 174/68 C |
| 4,582,093 | 4/1986 | Hubbard et al. | 138/111 |

FOREIGN PATENT DOCUMENTS

| 0076207 | 4/1983 | European Pat. Off. | 174/68 C |
| 57-114107 | 7/1982 | Japan | 350/96.23 |
| 58-211715 | 12/1983 | Japan | 350/96.23 |
| 1310419 | 3/1973 | United Kingdom | 174/68 C |

Primary Examiner—John Lee
Attorney, Agent, or Firm—John F. A. Earley; John F. A. Earley, III

[57] ABSTRACT

A fiber optic cable innerduct for containing and protecting fiber optic cable and for reducing the friction drag on the fiber optic cable as it is being pulled through the innerduct to allow for longer and more efficient cable pulls comprises an innerduct having a base with a circular cross section and longitudinal ribs spaced around the inner surface of the innerduct supporting the cable and for reducing friction drag on the fiber optic cable when it is being pulled through the innerduct by riding the fiber optic cable on the top ridges of the ribs.

9 Claims, 3 Drawing Figures

U.S. Patent     Aug. 25, 1987     4,688,890
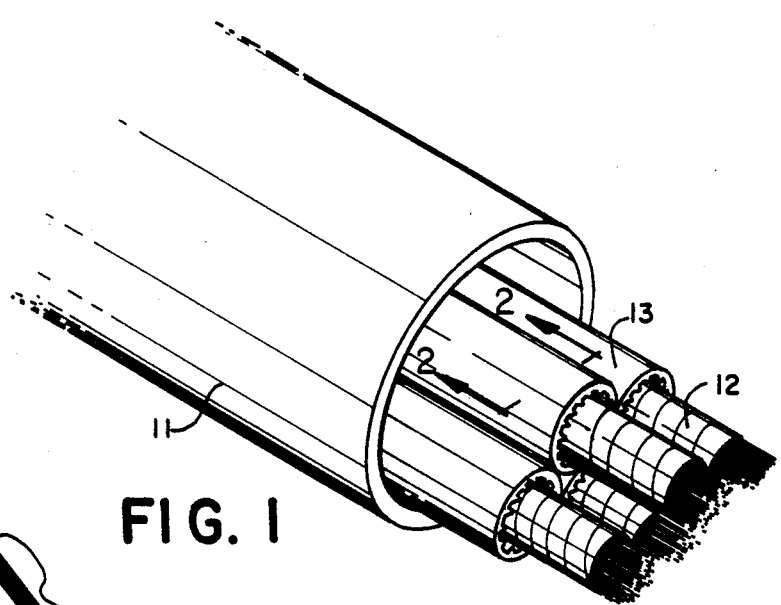
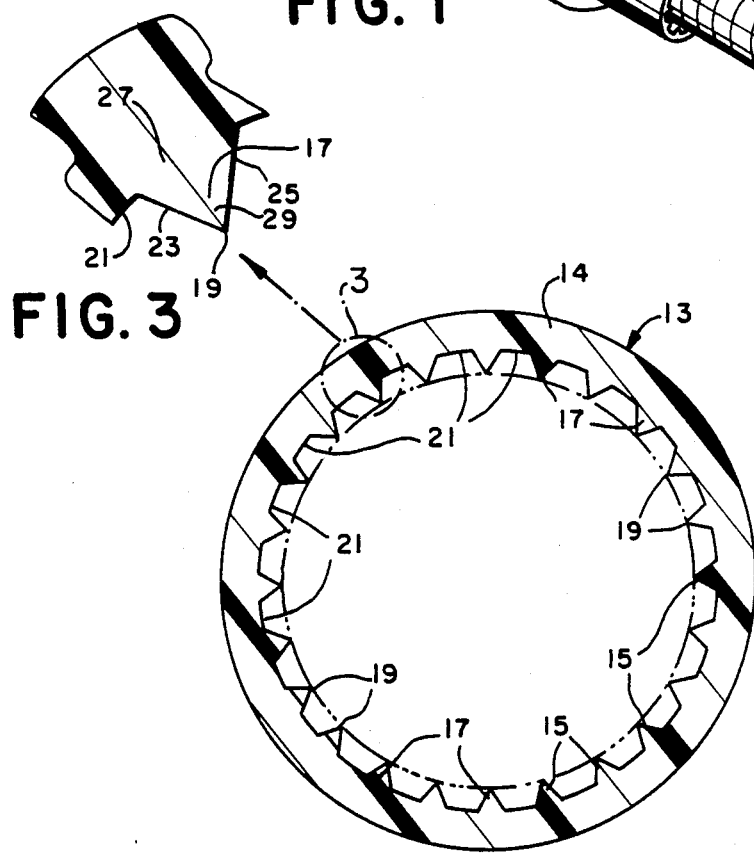

4,688,890

FIBER OPTIC CABLE INNER DUCT

BACKGROUND OF THE INVENTION

1. Field of the Invention

This invention relates to the field of fiber optic cable ducts for containing and protecting fiber optic cable, and more particularly concerns innerducts for protecting the cable and for reducing the friction drag on the fiber optic cable as it is being pulled through the innerducts to allow for longer and more efficient cable pulls.

2. Description of the Prior Art

Fiber optic cables are coming more and more into use in telephone lines, and they present problems of how to protect them from damage during installation and while installed in place. During installation in telephone networks, the fiber optics cable may be drawn through banks of 4 inch inside diameter ducts, with the ducts being made of concrete, clay tile, or polyvinyl chloride. For protection the fiber optic cable may be sheathed in polyethylene innerducts which are placed in the ducts and then the fiber optic cable is pulled through the innerducts. There may be 8 or 12 ducts placed side by side in a duct bank. Usually, no more than three or four innerducts may be placed in a duct.

In the prior art, innerducts had smooth walls, but when the fiber optic cable was pulled through the innerducts, there was so much frictional drag that the fibers of the cable were caused to separate. In general, if the frictional drag on the fiber optic cable exceeds about 600 pounds, the fibers separate.

Of course, the longer the cable pull, the cheaper the cable installation becomes because for a given distance you do not have to set up men and winches so often since you can set them up at distances which are farther apart.

In order to extend the length of the pull and reduce friction drag on the cable, various suggestions have been made. One suggestion was to provide corrugated duct having transverse ribs. However, this was not too successful since the corrugated ribs wiped the lubricant off the fiber optic cable.

SUMMARY OF THE INVENTION

An object of the invention is to provide an innerduct which protects fiber optic cable. Another object is to provide for longer cable pulls.

The objects of the invention are accomplished by providing the innerduct with rib means including longitudinal ribs spaced evenly around the inner surface of the innerduct for reducing friction drag by supporting the fiber optic cable on the top ridges of the ribs so as to thereby decrease the area of contact between the cable and the innerduct.

BRIEF DESCRIPTION OF THE DRAWINGS

FIG. 1 is a perspective view of a plurality of fiber optic cable innerducts positioned inside a telephone cable duct;

FIG. 2 is a view in section taken as indicated by the lines and arrows 2—2 that appear in FIG. 1; and FIG. 3 is a fragmentary enlargement taken as indicated by the circle 3 and arrow.

DETAILED DESCRIPTION

Turning now to the drawings, there is shown a fiber optic cable duct 11 for containing and protecting a number of fiber optic cables 12 each of which have a plurality of fiber optic strands contained within a jacket that holds the strands together and protects them from damage. Each fiber optic cable 12 is further protected by an innerduct 13. Innerduct 13 is so constructed that the friction drag on the fiber optic cable 12 as it is being pulled through the innerduct is reduced to allow for longer and more efficient cable pulls.

Innerducts 13 comprise a base portion 14 that has a circular cross section, and rib means 15 for reducing friction drag on the fiber optic cable when it is being pulled through innerduct 13. Rib means 15 includes longitudinal ribs 17 that have top ridges 19. Ribs 17 are spaced around the inner surface 21 of innerduct 13 and the top ridges 19 support the fiber optic cable 12 while being dragged through the innerduct 13.

Innerducts 13 are preferably made of polyethylene with an inner diameter of about 1 inch, and weigh about 19 pounds per 100 feet.

As is shown in FIG. 2, each innerduct 13 has 24 longitudinal ribs 17 that are evenly spaced around inner surface 21. Each rib 17 is preferably 0.15 inches high and has side walls 23 and 25, a base 27 and top ridge 19, and forms an isosceles triangle in cross section with an angle 29 at the top ridge 19 being about 60 degrees. Ribs 17 are spaced closely enough together that the fiber optic cable 12 is supported on top ridges 19.

Angle 29 is pointed but is not sharp enough to cut into the jacket of the fiber optic cable.

The method of protecting a fiber optic cable 12 by sheathing it with an innerduct 13 comprises coating the fiber optic cable 12 with a lubricant, pulling the cable 12 through the innerduct 13, and riding the cable 12 on the narrow top ridges 19 of ribs 17 to reduce friction drag and provide a longer pull distance.

Because the fiber optic cable 12 rides on the narrow top ridges 19 of ribs 17 rather than on the entire inner surface 21, the area of contact between the cable 12 and innerduct 13 is reduced, which reduces the friction drag and allows for longer and more efficient cable pulls.

ADVANTAGES

The longitudinal ribbed innerduct 13 of the present invention cuts the frictional drag to one-half that of a comparative smooth wall innerduct, thus making it possible to pull about twice the length of fiber optic cable through an innerduct than would be possible with a smooth walled innerduct. The standard length of pull with smooth walled innerducts was about 1,650 feet. Now, with the longitudinal ribbed innerduct of the present invention, pulls may be made from between 3,500 feet to 5,000 feet without damaging the fiber optic cable.

It is important to space the ribs 17 closely enough together so that the fiber optic cable 12 rides on the top ridges 19 of the ribs 17 rather than falling between the ribs 17 and riding on the inner surfaces 21. For example, with one inch inner diameter innerduct and twelve ribs spaced evenly around the inner circumference of the innerduct, the fiber optic cable fell between the ribs and rode on the inner surface of the innerduct which created much more friction drag and decreased the distance the cable could be pulled without damage to the cable.

Also, the ribbed duct of the present invention has a thinner wall and is lighter in weight than the comparative smooth walled innerduct. A typical 1 inch smooth wall innerduct weighs about 24.7 pounds per 100 feet, whereas a 1 inch longitudinal ribbed innerduct 13 of the present invention weighs about 19 pounds per 100 feet.

Also, the height of the ribs must not be too shallow or the cable does not ride on the top of the ribs and produces excessive friction drag.

If desired, a pull tape is inserted in the innerduct when it is being extruded so as to be already in place when it is desired to pull the fiber optic cable through the innerduct.

We claim:

1. A fiber optic cable innerduct for containing and protecting fiber optic cable and for reducing the friction drag on the fiber optic cable as it is being pulled through the innerduct to allow for longer and more efficient cable pulls, comprising an innerduct having a base portion with a circular cross section and an inner surface, and rib means extending from the inner surface for supporting the fiber optic cable and for reducing friction drag on fiber optic cable when it is being pulled through the innerduct, whereby the fiber optic cable is supported by the rib means to thereby decrease the area of contact between the fiber optic cable and the innerduct to reduce friction drag on the fiber optic cable when it is pulled through the innerduct.

2. The fiber optic innerduct of claim 1, said rib means including a plurality of longitudinal ribs having top ridges for supporting the cable in place and for supporting the cable when it is being pulled through the innerduct to reduce friction drag, said rib means being positioned sufficiently close together and spaced evenly around the inner surface of the base portion of the innerduct to support the cable on the top ridges of the ribs and not on the inner surface of the base portion of the innerduct.

3. The fiber optic innerduct of claim 2, the inside diameter of the innerduct being about 1 inch, The height of each rib being about 0.15 inches, and there being 24 ribs spaced evenly apart.

4. The fiber optic cable innerduct of claim 2, each rib having a pair of side walls and an apex angle between the top of the side walls, the apex angle between the top of the side walls of each rib being pointed but not sharp enough to cut into the fiber optic cable.

5. The fiber optic cable innerduct of claim 4, said apex angle being about 60 degrees.

6. The fiber optic cable innerduct of claim 1, said innerduct being made of polyethylene.

7. The fiber optic cable innerduct of claim 1, said innerduct being positioned inside a telephone cable duct.

8. A fiber optic cable innerduct for containing and protecting fiber optic cable and for reducing the friction drag on the fiber optic cable as it is being pulled through the innerduct so as to allow for longer and more efficient cable pulls, comprising a polyethylene innerduct having a base portion with a circular cross section and an inner surface having an inner diameter of about 1 inch, 24 longitudinal ribs spaced evenly around the inner surface of the innerduct for supporting the fiber optics cable as it is being pulled through the innerduct, each rib being about 0.15 inches high with side walls extending from the base portion to a top ridge, the apex angle between the top of the side walls of the ribs being pointed but not sharp enough to cut into the fiber optic cable, the apex angle between the side walls at the top of the ribs being about 60 degrees, whereby on pulling the fiber optic cable into the innerduct the cable rides on the tops of the ribs to reduce the friction drag on the cable.

9. A method of protecting a fiber optic cable by sheathing it with an innerduct having longitudinal ribs with narrow top ridges, comprising coating the fiber optic cable with a lubricant, pulling the cable through the innerduct, and riding the cable on the narrow top ridges of the ribs to reduce friction drag and provide a longer pull distance.

* * * * *